May 4, 1948.  R. R. ROSEL  2,440,759

VERTICAL ADJUSTMENT DEVICE FOR EARTH WORKING TOOLS

Filed April 17, 1944  2 Sheets-Sheet 1

RALPH R. ROSEL INVENTOR.

BY
Francis C. Huebner,
ATTORNEYS.

May 4, 1948.  R. R. ROSEL  2,440,759
VERTICAL ADJUSTMENT DEVICE FOR EARTH WORKING TOOLS
Filed April 17, 1944  2 Sheets-Sheet 2
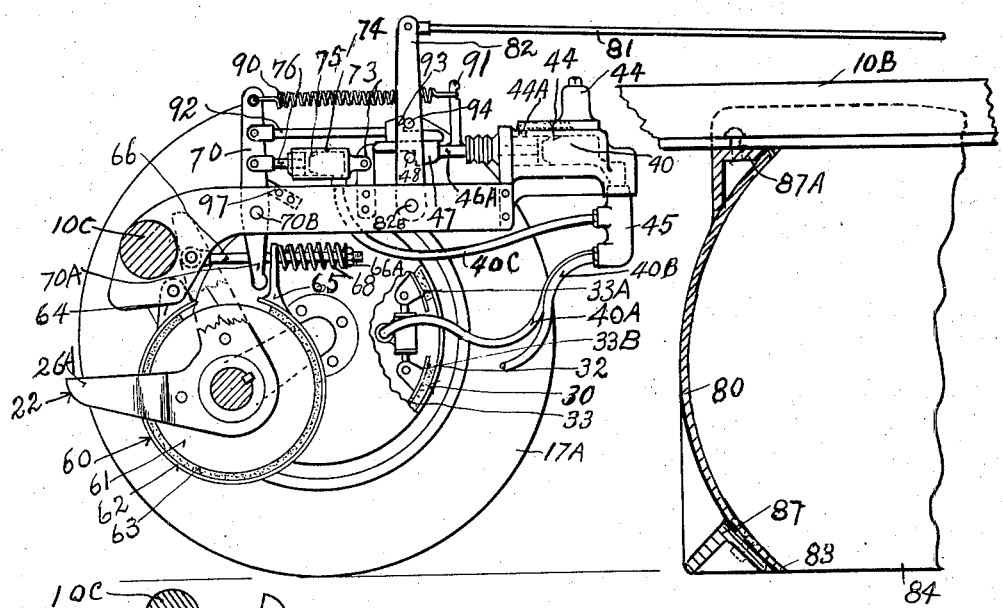
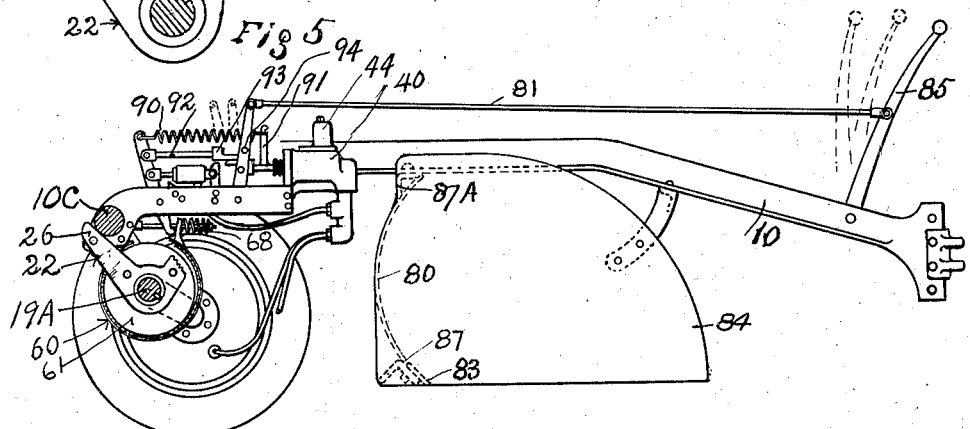
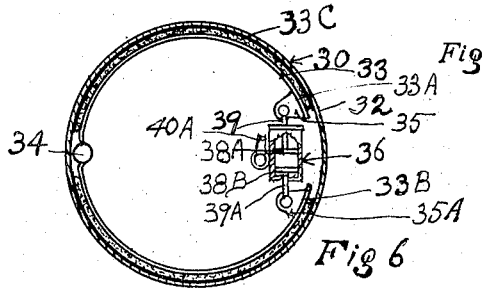
INVENTOR.
RALPH R. ROSEL
BY
Francis C. Huebner
ATTORNEYS.

Patented May 4, 1948

2,440,759

UNITED STATES PATENT OFFICE 2,440,759

VERTICAL ADJUSTMENT DEVICE FOR EARTHWORKING TOOLS

Ralph R. Rosel, Fresno, Calif.

Application April 17, 1944, Serial No. 531,351

2 Claims. (Cl. 37—169)

My invention relates to a device for securing quickly and positively vertical adjustments for earth working tools. Relating to dirt scrapers to which it is specially adapted, the cutting edge of the scraper can be adjusted while the tool is in operation to a depth which is predetermined to cut into the earth, or to a height at which the dirt in the scraper bowl can be spread at a predetermined thickness, or transported to be scattered elsewhere.

The object I have accomplished is in connection with an earth working tool such as a dirt scraper in which adjustments as to the depth of the cut when the scraper is being filled, or the heights of the bowl above the earth when it is desired to spread the earth theretofore filled into the bowl, can be accomplished positively, and easily by the operator while the tool is being operated. In connection with other tools, such as plows, the depth of the cut of the plow can be positively fixed by the operator by the simple movement of a lever, and while the tool is being operated, or the entire plow can be lifted from engagement with the earth when desired, and while the tool is being operated.

These and other objects can be accomplished by means of the device hereinafter explained and illustrated on the accompanying drawing, in which Fig. 1 is a top plan view of the device with a dirt scraper bowl attached thereto.

Fig. 3 is an enlarged side view of the rear portion of the device, having parts cut away to show detailed views of the wheel brake and the axle brake, the scraper blade or bowl being shown in section.

Fig. 4 is a view from the same side as shown in Fig. 3, but reduced in size to show the full length of the device, and its general appearance without the cut-away portions shown in Fig. 3.

Fig. 5 is a separate view of stop means for rotation of the axle.

Fig. 6 is an isolated view of the wheel brake.

Figure 1:
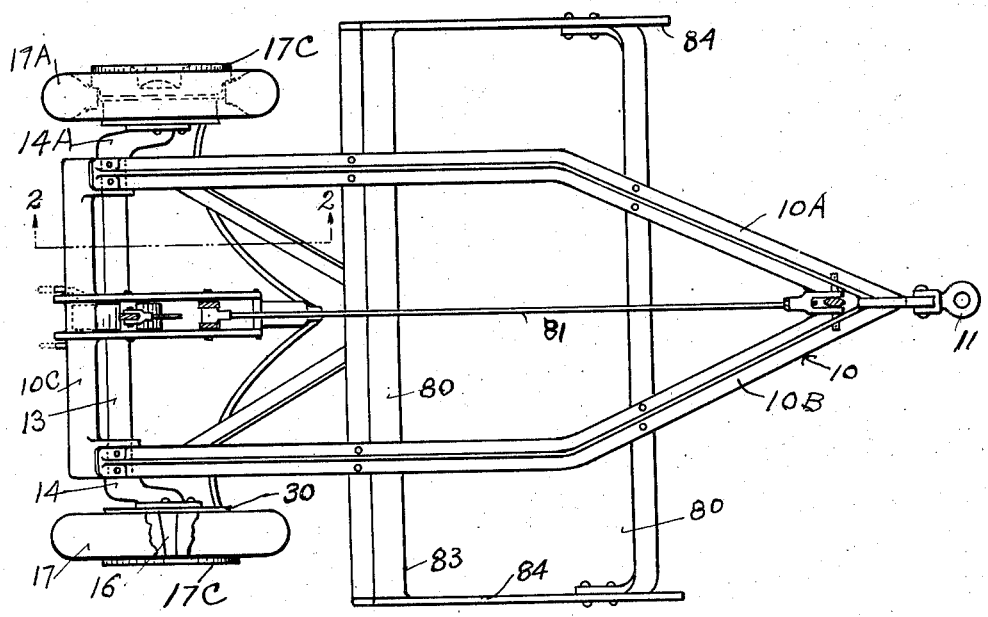
Figure 2:
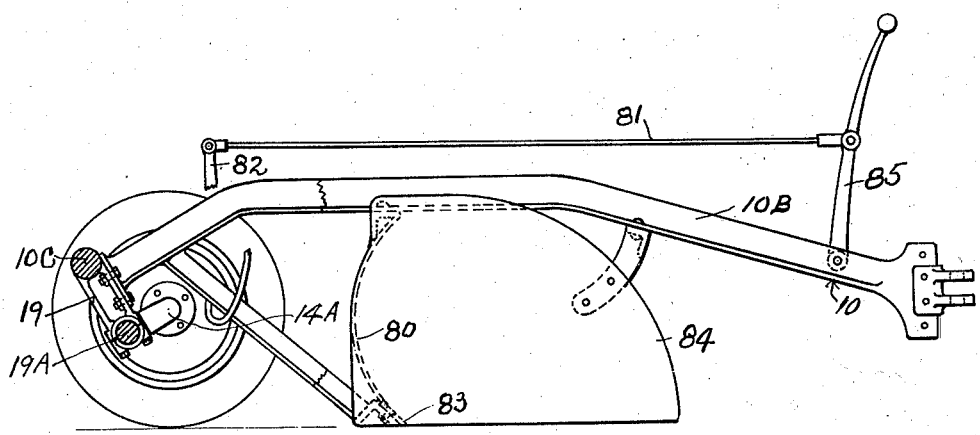
Fig. 2 is a side view of the device as shown in Fig. 1, a portion thereof being in section corresponding with the view along section line 2—2 in Fig. 1.

Referring to the drawing, I have provided a frame 10, which frame consists of beams 10A and 10B positioned parallel for a spaced distance, and thence bent to converge at a point at which draft link 11 is attached. The ends of beams 10A and 10B opposite to the converging ends above described are tied a spaced distance apart with a rod, or bar 10C, all of which is shown in Fig. 1. Rod or bar 10C, as shown in Fig. 2, has a depending member 19, which member 19 terminates at the free end with a bearing 19A, in which bearing 19A the axle 13 can have a rotating, or rocking movement. Frame 10 is attached to axle 13 as above described.

Axle 13 terminates at each end with a crank, 14 and 14A, these cranks being of equal radial length from the center line of axle 13, and are positioned on a common parallel plane.

Each of the cranks 14 and 14A is provided with a spindle shown as 16 in Fig. 1. Traction wheels 17 and 17A are carried on said spindles 16.

Each traction wheel is provided with brake 30, which brake is adapted to lock the wheel to the spindle on which it is carried, and likewise to axle 13. The brake I have disclosed is the well known internal expansion variety, although in my invention any form of brake can be used which will lock the wheel to the axle. Brake 30, shown in Figs. 3 and 6 consists of drum 32, which is attached to and rotates with wheel 17A. A circular band 33, cut at one point in the circumference so it can be expanded or contracted with reference to its periphery, is positioned within the drum, and concentric therewith. Band 33 is anchored with pin 34, shown in Fig. 6, to some portion of the device which does not rotate with the wheel. This brake is made effective by expanding the diameter of band 33 by pushing ends 33A and 33B apart. This brings band 33 in frictional relationship with the internal periphery of drum 32. To accomplish this spreading I have attached ears 35 and 35A to the ends of band 33, and have placed hydraulic cylinder 36 between them, all of which is more clearly shown in Fig. 6. Hydraulic cylinder 36 is fitted with two pistons, 38A and 38B, which pistons have piston rods 39 and 39A pivotally attached to ears 35 and 35A. A lead 40A from master cylinder 40 to cylinder 36 is adapted to introduce liquid under pressure between pistons 38A and 38B, thus forcing them apart and thereby expanding brake band 33. The means for forcing fluid from master cylinder 40 into hydraulic cylinder 36 will be explained in connection with the operation of axle brake 60 hereinafter referred to. It is here noted that brake 30 is made effective by placing brake band lining 33C thereon.

It is noted that when power is applied to the tool through link 11, the tool is given a forward movement. When wheel brake 30 is applied to the wheel, locking it to the axle, the natural result of the forward movement would be that axle 13 and wheels 17 and 17A will rotate together on bearing 19A.

Inasmuch as hitch 11 at the front end of frame 10, when attached to a tractor, is adapted to hold the frame 10 an approximately fixed distance from the earth, axle 13 will rotate, and on the upward movement of such rotation will lift any tool which may be suspended therefrom. The position of scraper bowl 80 when thus lifted is shown in Fig. 4.

It is also noted that normally, when brake 30 is applied and the rotation of the assembly of wheels 17 and 17A and axle 13 is effective such assembly would tend to make a complete revolution. As the object of my invention is to raise and lower the frame within defined limits, I have attached a V-shaped catch 22 firmly to axle 13. This catch is shown in Fig. 5, and also with parts cut away in Figs. 3 and 4. V catch 22 is positioned on the axle so that when the lowest point it is desired to have the axle travel has been reached, stem 26B will engage tie bar 10C which then functions as a stop, and when the axle has reached the highest point desired in its rotation, stem 26A engages tie bar 10C.

For the purpose of holding axle 13 at any selective height between the limits referred to, I have attached a brake 60 to axle 13. For this use I prefer the external band form. Brake 60 consists of drum 61, rigidly attached to axle 13, and positioned concentric therewith. The details of this brake are shown more clearly in Figs. 3 and 4. The outside periphery of drum 61 is adapted as a braking surface. This periphery is surrounded by band 62 which has been lined with brake lining 63. An ear 64 is attached to one end of band 62, which ear is pivotally attached to member 10C of the frame, or to some other portion of the device which does not rotate with wheel or axle. The end of band 62 which is not pivotally mounted floats freely so it can expand and be loose on the periphery of drum 61, or it can be drawn tightly thereon creating friction, and holding the axle from rotating. This is accomplished by attaching a lug 65 to the floating end of band 62. Lug 65 has a hole therethrough which is threaded by rod 66. Rod 66 is pivotally attached at one end to an appropriate portion of frame 10, the portion of frame 10 which is aligned with the movement of lug 65 being preferred. A compression spring 68 is threaded on rod 66, and anchored at one end to rod 66, or held by a spring seat or base 66A shown in Fig. 3, which anchor or base is at the free end of rod 66, so that spring 66 is between the spring seat 66A and lug 65. Normally spring 68 is of sufficient strength to tighten band 62 on drum 61 to lock axle 13 from rotating.

For the purpose of releasing brake 60 I have devised mechanism consisting of a lever 70, pivotally connected with pivot 70B to frame 10, so that the lower end 70A can bear against lug 65, and on the side of said lug 65 opposite to the face adjacent to spring 68, said lever being adapted to move lug 65 against the compression of spring 68, and thus loosen brake-band 62 on drum 61.

Power for moving lever 70 against spring 68 consists of an hydraulic cylinder 74, closed at one end and attached to post 73, which post is attached to frame 10. A piston 75 fitted within cylinder 74, a piston rod 76 attached to piston 75, and a pivotal connection between the end of piston rod 76 and lever 70 is the mechanism directly adapted to move lever 70. Fluid pressure to operate and move piston 75 within cylinder 74 comes from master cylinder 44 which is herein explained.

I have provided a master cylinder 40 which contains fluid adapted for use in hydraulic cylinders. To cylinder 40 is attached a container 44 for holding auxiliary fluid for use when needed. Container 44 has an outlet 44A into the master cylinder 40. Cylinder 40 has an outlet 40A into brake cylinder 30, and an outlet 40C into cylinder 74. Lead 40B extends to the brake in wheel 17, not shown on the drawing, but similar in all respects to brake 30. Leads 40A, 40B and 40C are all connected with master cylinder 40 by means of a common connection 45 shown in Figs. 3 and 4. Master cylinder 40 has a piston 46 fitted therein, and piston 46 has a piston rod 46A attached thereto. Piston rod 46A terminates with a shoulder 47 which shoulder is adapted to engage a stop 48 on lever 82. Lever 82 is pivotally attached at one end to frame 10 by pivot 82B. The opposite end of lever 82 carries a rod 81 which extends to a pivotally mounted hand lever 85, by which hand lever, operating lever 82 is manipulated. Between the ends of operating lever 82 is a stop 48, which is adapted to contact shoulder 47 on piston rod 46A. It will be noted that when lever 82 is moved forward, stop 48 contacts shoulder 47 on piston rod 46A, and moves piston 44 against the fluid within cylinder 40, forcing the fluid therein through leads 40A and 40C into hydraulic cylinders 36 and 74. The fluid under pressure in cylinder 36 locks wheel 17A to axle 13, while simultaneously pressure of the fluid in cylinder 74 releases brake 60, thereby accomplishing a vertical adjustment of axle 13 and likewise vertical adjustment of frame 10 and the tool carried thereon. It is noted that in Fig. 3 the axle brake is shown in effective position and use, and in Fig. 4 the same brake is shown as ineffective.

A light spring 90 connects lever 70 with post 91, which post 91 is attached to rod 46A. Spring 90 is adapted to return lever 70 to a vertical position, and to keep lever 82 in a neutral position. A stop rod 92 is pivotally attached at one end to lever 70. The free end of stop rod 92 terminates with a shoulder 93 which is adapted to engage stop 94 located on lever 82. Rod 92 in combination with shoulder 93 and stop 94 permits the releasing of brake 60 independently of the co-operation of brake 30.

It will be observed that when axle 13 is locked from rotating, the height of the axle from the ground is fixed positively until another adjustment is desired, and by the means herein described, by manipulating hand lever 85, the operator can raise the frame and axle to the height desired, and forthwith lock the mechanical elements in that position.

Scraper bowl 80 is of the well known drag type which consists of a curved back 80 terminating adjacent to the bottom with a cutting edge 83. Wings 84 are positioned on each side to hold the earth from spreading at the ends of bowl, but there is no bottom to the bowl.

When it is desired to lower frame 10 and bowl 80, hand lever 85 is moved backward so that rod 81 will work in reverse of raising the bowl. By this reverse movement master cylinder 44 will remain inactive. Stop 94 on lever 82 will engage shoulder 93 on rod 92, which engagement results in lever 70 moving on pivot 70B in the direction adapted to release brake 60 on axle 13, and at the same time permitting the brakes 30 on wheels 17 and 17A to remain ineffective, whereby the bowl and frame can, by force of gravity, drop toward the earth.

Cutting edge 81 of the scraper will tend to draw the tool into the earth within the stop limits hereinbefore described. It is here noted that weights 17C can be attached to wheels 17 and 17A to make the device more effective in making all of the adjustments and functions herein described more positive in action. Such additional weights are not essential as in lieu thereof the wheels can be built heavier. When the depth of the cut of the scraper blade has been reached, by manipulating hand lever 85 the pressure of lever 70 against lug 65 is released, and immediately on such release spring 68 is normally effective to make brake 60 effective, and thereby the scraper bowl is locked in position to make the depth of the cut positive.

Stop 97 is adapted to limit the movement of lever 70.

When the scraper bowl is filled with earth, by means heretofore described it can be raised so that the cutting edge is on a common plane with the earth, or at any fixed point above the earth, and locked in that position. When thus adjusted the ground or earth carried by the scraper will be unloaded and spread over the earth the depth of such adjusted position above the earth.

It is understood that other brakes can be used than those described herein in detail, as the invention disclosed resides in the means for applying the brakes for wheels 17 and 17A, and for axle 13, either independently, or in cooperation with each other as herein described, and for the purposes set forth.

I claim as new and ask for Letters Patent:

1. A device for regulating the vertical adjustment in an earth working tool while being moved over the earth with motive power, such earth working tool being supported on a frame, consisting of a carriage support for the frame having an axle journaled to the frame so the axle can have a rocking movement, the axle terminating at both ends with radial cranks extending equidistant from the center line of the axle, and on the same general plane, each crank terminating with a spindle carrying a traction wheel, a hydraulic brake adapted to lock the wheels with the axle, a brake on the axle adapted to rigidly lock the axle to the frame, the axle brake being made effective by spring means, hydraulic means for releasing the axle brake against the spring means, hand means operable at will to simultaneously operate the wheel hydraulic means and the axle hydraulic means consisting of a master cylinder having fluid therein, a piston within the cylinder adapted to be moved back and forth by the hand means, the movement of the piston back and forth being adapted to create and release pressure of the fluid within the master cylinder, and leads from the master cylinder for carrying the fluid pressure to said hydraulic means for operating the wheel brake and for releasing the axle brake.

2. A device for positively regulating adjustments in an earth working tool supported on a frame, comprising a carriage for the frame, consisting of an axle journaled to the frame, the axle being adapted to have a rotary movement, the axle terminating at both ends with uniform sized cranks, each crank terminating with a spindle, a traction wheel carried on each spindle, a friction brake adapted to lock the wheels to the axle, an axle friction brake adapted to hold the axle rigid with the frame at any selected position in the rotary movement of the axle, hydraulic pressure means for applying the wheel friction brake, spring means adapted to make effective the axle friction brake, hand means operable at will for making the hydraulic means effective, the same hand means being adapted to actuate the hydraulic means to overcome the spring tension actuating the axle brake at approximately the same time the wheel brake is applied, so that by manipulation of common hand means, and at will, the axle can be moved to, and held in any position desired in its path of rotation, and means independent of the hydraulic means, and controlled by the hand means, for releasing the axle brake so that neither brake is effective.

RALPH R. ROSEL.

REFERENCES CITED

The following references are of record in the file of this patent:

UNITED STATES PATENTS

| Number | Name | Date |
| --- | --- | --- |
| 1,831,899 | Willig | Nov. 17, 1931 |
| 2,255,061 | Johnson | Sept. 6, 1941 |